(12) United States Patent  
Guerin (10) Patent No.: US 11,883,890 B2  
(45) Date of Patent: Jan. 30, 2024

(54) ORBITAL DRILLING DEVICE

(71) Applicant: ADVANCED ELECTRICAL TOOLS, Seclin (FR)

(72) Inventor: Sylvain Guerin, Seclin (FR)

(73) Assignee: ADVANCED ELECTRICAL TOOLS, Seclin (FR)

( * ) Notice: Subject to any disclaimer, the term of this patent is extended or adjusted under 35 U.S.C. 154(b) by 332 days.

(21) Appl. No.: 17/268,488

(22) PCT Filed: Aug. 9, 2019

(86) PCT No.: PCT/EP2019/071505  
§ 371 (c)(1),  
(2) Date: Feb. 15, 2021

(87) PCT Pub. No.: WO2020/035422  
PCT Pub. Date: Feb. 20, 2020

(65) Prior Publication Data  
US 2021/0260671 A1    Aug. 26, 2021

(30) Foreign Application Priority Data  
Aug. 16, 2018  (FR) ...................................... 1857512

(51) Int. Cl.  
*B23C 3/02* (2006.01)  
*B23Q 5/32* (2006.01)

(52) U.S. Cl.  
CPC ............ *B23C 3/02* (2013.01); *B23C 2220/52* (2013.01); *B23C 2265/12* (2013.01); *B23Q 5/326* (2013.01); *Y10T 409/307616* (2015.01)

(58) Field of Classification Search  
CPC ... B23C 2220/52; B23C 3/02; B23C 2265/12; Y10T 409/307616; Y10T 409/403325;  
(Continued)

(56) References Cited

U.S. PATENT DOCUMENTS 5,429,459 A  *  7/1995  Palm ................... B23Q 11/0042  
                                                408/222  
6,663,327 B2 * 12/2003  Linderholm .............. B23C 3/02  
                                                409/200

(Continued)

FOREIGN PATENT DOCUMENTS

CN        102 699 403        3/2014  
CN        103659403 A  *  3/2014 ............. B23Q 11/00

(Continued)

OTHER PUBLICATIONS

CN-103659403 Machine Translation (Year: 2014).*  
(Continued)

*Primary Examiner* — Sunil K Singh  
*Assistant Examiner* — Michael Vitale  
(74) *Attorney, Agent, or Firm* — NIXON & VANDERHYE (57) ABSTRACT

An orbital drilling device includes, on the same frame: a motor rotating a cutting tool on itself; a first, interior, eccentric, receiving the motor, mounted so as to be able to rotate; a second, exterior, eccentric, receiving the first eccentric, mounted so as to be able to rotate; a reference body, secured to the frame, receiving the second eccentric, mounted so as to be able to rotate; a first unit for driving the first eccentric; a second unit for driving the second eccentric, simultaneously with the rotation of the first eccentric; and a controller configured to reproduce any path of the cutting tool in the zone by continuous control of the angular offset between the first eccentric and the second eccentric.

14 Claims, 6 Drawing Sheets

(58) Field of Classification Search
CPC . Y10T 29/1106; B23Q 1/5486; B23Q 1/5481; B23Q 1/5493; B23Q 1/4885; B23Q 5/225; B23Q 5/326; B23B 41/06; B23B 39/10
See application file for complete search history.

(56) References Cited

U.S. PATENT DOCUMENTS

| | | | | |
|---|---|---|---|---|
| 7,189,038 | B2* | 3/2007 | Stuxberg | B23Q 1/5468 409/232 |
| 2003/0017017 | A1 | 1/2003 | Linderholm et al. | |
| 2013/0287509 | A1* | 10/2013 | Guerin | B23Q 5/326 408/137 |

FOREIGN PATENT DOCUMENTS

| | | | | |
|---|---|---|---|---|
| CN | 103 659 403 | | 1/2016 | |
| CN | 106 077 774 | | 11/2016 | |
| DE | 10348801 | B3 * | 5/2005 | ....... B23B 29/03482 |
| EP | 1 635 975 | | 3/2006 | |
| EP | 2 529 867 | | 12/2012 | |
| JP | 62193717 | A * | 8/1987 | |
| WO | 01/15870 | | 3/2001 | |
| WO | 2009/005446 | | 1/2009 | |

OTHER PUBLICATIONS

JP-62193717 (JP-1987193717) Machine Translation WIPO IP Portal Patentscope (Year: 1987).*
DE-10348801 Machine Translation (Year: 2005).*
International Search Report for PCT/EP2019/071505 dated Oct. 16, 2019, 4 pages.
Written Opinion of the ISA for PCT/EP2019/071505 dated Oct. 16, 2019, 6 pages.

* cited by examiner

ORBITAL DRILLING DEVICE

This application is the U.S. national phase of International Application No. PCT/EP2019/071505 filed Aug. 9, 2019 which designated the U.S. and claims priority to FR Patent Application No. 1857512 filed Aug. 16, 2018, the entire contents of each of which are hereby incorporated by reference.

BACKGROUND OF THE INVENTION

Field of the Invention

The present invention relates to an orbital drilling device.
The field of the invention is that of the machining of parts and in particular parts made from metal or composite material, in particular used in the aeronautical industry.

Description of the Related Art

As is well known, orbital drilling consists of the production of a hole using a cutting tool moving in an orbital path resulting from the combination of:
  a first rotation of the cutting tool about the axis thereof, and
  a second rotation of the cutting tool about an off-center rotation axis, shifted radially with respect to the axis of the cutting tool.

The rotation of the cutting tool about these two combined rotation axes enables the cutting tool to describe an orbital movement and to effect a circular-shaped drilling to the required shape and dimensions.

The radial offset between these two rotation axes can generally be adjusted in order to be able to perform circular-shaped drillings of various dimensions with the same cutting tool, with great precision in the manufacturing dimensions, using various adjustment means.

For example, an orbital drilling device comprising a milling cutter driven by a pneumatic motor, said motor being substantially cylindrical in shape, is known from the document WO 01/15870.

The motor is mounted fixedly in a first ring off-center with respect to the rotation axis of the rotor of the motor, itself mounted in a second ring off-center with respect to the first eccentric ring, with a rotation axis parallel to that of the first off-center ring.

The offset between the two rotation axes of the milling cutter is set by adjusting the relative positions of the off-center rings by means of a screw mounted on the second off-center ring, the thread of which meshes with teeth arranged on the circumference of the first off-center ring. A second pressure screw, also mounted on the second off-center ring, Such a device has several drawbacks. Firstly, adjusting the offset is done manually by an operator and may therefore prove to be imprecise, which will impair the quality of manufacture of the parts machined with such a device.

In addition, the adjustment of the offset can be done only when the milling cutter is not rotating, which increases the time for performing the drilling operations performed with such a device.

An orbital drilling tool intended to be mounted on a machine-tool arbor is also known from the document WO 2009/005446 A1, comprising:
  an outer eccentric body comprising a cylindrical eccentric hole extending longitudinally,
  an inner eccentric body mounted rotatably in the eccentric hole of the outer eccentric body and also having a cylindrical eccentric hole extending longitudinally,
  an arbor motor for removably receiving a cutting tool and mounted rotatably in the eccentric hole of the inner eccentric body,
  a tool holder attached concentrically to a machine-tool end of the outer eccentric body for mounting the latter removably on a machine-tool arbor for rotating the outer eccentric body,
  means for adjusting the radial offset, comprising an electric motor and a drive belt, configured to rotate the inner eccentric body with respect to the outer eccentric body in order to adjust the radial offset of the rotation axis of the motor with respect to the rotation axis of the arbor motor of the machine-tool arbor, and
  a means for transferring the power to the arbor motor and to the means for adjusting the radial offset.

Even if this device has the advantage of allowing a more precise adjustment than a manual adjustment by virtue of the use of an electric motor for driving the movement of the outer eccentric body with respect to the inner eccentric body, this still has several drawbacks.

This is because the use of a belt for driving the outer eccentric body with respect to the inner eccentric body may cause lack of precision in the adjustment of the offset of the outer eccentric body with respect to the inner eccentric body, because of the stretching of the belt over time.

In operation, the tool holder of the orbital drilling tool is fixed to the arbor of a machine tool, the orbital drilling tool being designed to pivot overall under the action of the arbor, including the arbor motor receiving the cutting tool, and the motor of the means for adjusting the radial offset. One defect of such a tool is that it requires rotating electrical connectors for the electrical supply to these two motors.

The orbital movement is obtained by the rotation of the arbor by a motor of the machine tool, and the rotation of the cutting tool about the axis thereof by the arbor motor of the tool, the motor of the means for adjusting the radial offset then being stopped.

A second defect of such an orbital drilling tool is therefore that it is not self-contained, the requirement being combined with the arbor of a machine tool for allowing the implementation of an orbital drilling.

Moreover, the devices described in the documents WO 01/15870 and WO 2009/005446 A1 allow only the performance of drilling with a substantially circular cross-section.

An orbital drilling device comprising an arbor motor unit driving a cutting tool about the axis thereof, a mechanism for adjusting the radial offset, an eccentric rotation mechanism and an axial movement mechanism are also known from the document US 2003/017017 A1 or from the document WO 2004/113002 A1.

The mechanism for adjusting the radial offset comprises:
  an inner cylindrical body with an eccentric cylindrical drilling, said eccentric drilling having a central longitudinal axis parallel to and radially offset from a central longitudinal axis of said inner cylindrical body, said eccentric drilling being configured so as to radially and rotationally support said arbor unit for driving said cutting tool, and
  an outer cylindrical body with an eccentric cylindrical drilling, said eccentric drilling of said outer cylindrical body having a central longitudinal axis parallel to and offset radially from a central longitudinal axis of said outer cylindrical body by a distance equal to the distance between said central axis of the eccentric drilling of the inner body and said central axis of the inner cylindrical body, said inner cylindrical body being radially supported in said eccentric drilling of the outer cylindrical body and able to move in rotation with respect thereto, so as to be able to adjust the radial distance between said central axis of the cutting tool and said principal axis.

By means of a mutual relative rotation of the inner and outer cylindrical bodies, it is thus possible to position the central axis of the eccentric drilling of the inner cylindrical body so as to adjust the radial offset between the central axis of the tool and the principal axis of the orbital drilling device.

The outer cylindrical body is rotated by a motor by means of a belt that cooperates with a pulley connected to the outer body. Likewise, the inner cylindrical body is rotated by a motor by means of a belt that cooperates with a pulley connected to the inner body, by means of a coupling means allowing an axial offset.

A relative rotation between the inner cylindrical body and the outer cylindrical body by a driving of each of these cylindrical bodies with different rotation speeds modifies the radial offset of the cutting tool.

This makes it possible, in combination with the axial-movement mechanism of the cutting tool, to envisage various geometries of drillings performed with this orbital drilling device.

According to the findings of the inventor, such an orbital drilling device does nevertheless have several drawbacks.

As can be seen in the example embodiment in FIG. 1 of the document US 2003/0017017 A1, or in FIG. 3 and FIG. 5 of the document WO 2004/113002 A1, the use of an arbor motor unit rotating the cutting tool extending longitudinally, along the axis of the inner cylindrical body or of the outer cylindrical body, beyond the mechanism for adjusting the radial offset (i.e. the assembly consisting of inner cylindrical body and outer cylindrical body), projecting on the rear part of the orbital drilling device, also considerably increases the longitudinal bulk of such an orbital drilling device.

Also, the designs according to the document US 2003/0017017 A1 or according to the document WO 2004/113002 A1 make it necessary to position the motors driving the outer and inner eccentric bodies, and also the motor of the axial-movement mechanism, with a significant offset with respect to the mechanism for adjusting the radial offset, in a radial direction of the inner cylindrical body or of the outer cylindrical body, which considerably increases the radial bulk of such an orbital drilling device. Such a design thus necessitates the use of a belt transmission for causing the rotations of the inner and outer eccentric cylindrical bodies.

Furthermore, and according to the findings of the inventor, the use of a belt transmission causes lack of precision in the adjusting of the radial offset of the cutting tool, and all the more so when this adjustment is performed dynamically by the relative rotation between the inner cylindrical body and the outer cylindrical body.

SUMMARY OF THE INVENTION

The invention sets out to overcome all or some of the drawbacks of the orbital drilling devices of the prior art by proposing an orbital drilling device making it possible to precisely adjust the radial offset between the two rotation axes of the orbital movement.

Another objective of the present invention is, at least according to one embodiment, to make it possible to quickly perform drillings of a greater diversity, in terms of shape and dimensions, in comparison with the aforementioned prior art described in the documents WO 01/15870 and WO 2009/005446.

Another aim of the present invention is, at least according to one embodiment, to propose a drilling device that is self-contained in that it does not need to be coupled to the arbor of a machine tool for obtaining an orbital drilling.

Another aim of the present invention is to propose an orbital drilling device with reduced bulk, in particular radial and longitudinal, in comparison in particular with the prior art known from the document US 2003/0017017 A1 or from the document WO 2004/113002 A1.

Thus the invention relates to an orbital drilling device comprising, on the same frame:
a motor,
a cutting tool rotated on itself by said motor, about its rotation axis,
a first, inner, eccentric, comprising a hollow cylindrical body receiving said motor, said first eccentric being configured to be mounted so as to be able to rotate with respect to the motor, said motor being configured to be mounted substantially rotationally immobile with respect to the frame about the axis of rotation of the cutting tool on itself, the first eccentric comprising an internal cylindrical wall of axis $A13i$ and an external cylindrical wall of axis $A13e$, the axis of the internal cylindrical wall being offset by a distance $E13$ with respect to the axis of the external cylindrical wall,
a second, outer, eccentric, comprising a hollow cylindrical body receiving the first eccentric, mounted so as to be able to rotate with respect to the second eccentric, the second eccentric comprising an internal cylindrical wall of axis $A14i$ and an external cylindrical wall of axis $A14e$, the axis of the internal cylindrical wall being offset with respect to the axis of the external cylindrical wall,
a reference body, secured to the frame, comprising an internal cylindrical wall of axis $A15i$, receiving the second eccentric, mounted so as to be able to rotate with respect to the reference body,
a first drive means configured to rotate the first eccentric with respect to the frame, at a rotation speed $\omega 1$,
a second drive means configured to rotate the second eccentric with respect to the frame at a rotation speed $\omega 2$, simultaneously with the rotation of the first eccentric with respect to the frame,
control means configured for producing a drilling to the required shape and dimensions through the following of a given path by the cutting tool, by implementing the following steps:
rotation of the cutting tool on itself about the rotation axis thereof,
continuous and simultaneous rotations of the first eccentric with respect to the frame at a rotation speed $\omega 13$, and of the second eccentric with respect to the frame at a rotation speed $\omega 14$ so that the cutting tool also performs a rotation about the axis of the reference body with a radius corresponding to the distance separating the axis of the reference body from the axis of rotation of the cutting tool on itself, and
continuous and simultaneous control of the angular position and of the rotation speed with respect to the frame of the first eccentric, and of the angular position and of the rotation speed with respect to the frame of the second eccentric, so that the cutting tool follows said given path, situated in a zone defined between the circle centered on the axis and of radius |E13−E14|, and the circle centered on the axis and of radius E13+E14.

According to the invention, said control means are suitable for reproducing any path of the cutting tool in said zone by continuous control during the drilling of the angular offset between the angular position with respect to the frame of the first eccentric and the angular position with respect to the frame of the second eccentric.

According to optional features of the invention, taken alone or in combination:
- the first drive means comprises a first peripheral toothed ring, mounted so as to rotate about the axis of the reference body, constrained to rotate with the first eccentric, and a motor, secured to the frame, with a toothed pinon mounted on the drive shaft of the motor meshing with said first toothed ring, the first toothed ring and the first eccentric being secured together by means of an Oldham coupling in order to compensate for any offset between the first toothed ring and the first eccentric;
- the second drive means comprises a second peripheral toothed ring, secured to and coaxial with the external cylindrical wall of the second eccentric and a motor with a toothed pinon mounted on the drive shaft of the motor and meshing with said toothed ring;
- the motor of the first drive means and the motor of the second drive means are fixed to the same fixing wall, secured to the frame;
- the motor of the first drive means and the motor of the second drive means are disposed so as to be offset longitudinally, along the axis of the reference body, with respect to the motor rotating the cutting tool, the motor driving the cutting tool, received in the first eccentric, being positioned in an intermediate longitudinal position between the cutting tool and the motors of the first drive means and of the second drive means, and wherein the motor of the first drive means and the motor of the second drive means are each, at least partially, overlapping radially with respect to the radius of the external cylindrical wall of the second eccentric;
- the motor of the first drive means and/or the motor of the second drive means has one or more of the following characteristics:
  - low-voltage motor, in particular below 48 volts,
  - brushless electric motor,
  - external-rotor motor,
  - weight-to-power ratio greater than 5 W/g,
  - using a magnet technology with a high Curie point, in particular substantially equal to approximately 200°,
  - having winding wires the insulators of which can withstand temperatures of 180° C.;
- the first toothed ring of the first drive means and the second toothed ring of the second drive means are identical, having the same diameter, the same number of teeth, and the same tooth pitch and profile;
- the orbital drilling device further comprises means for driving the cutting tool in translation, in a direction parallel to the axis of rotation of the cutting tool on itself, in order to allow the translational movement of the cutting tool;
- the means for driving in translation comprise a screw/nut system, comprising a threaded rod rotated by means of a motor and a nut mounted so as to be able to move in translation with respect to the frame, said threaded rod being received in said nut;
- the motor of the means for driving in translation is fixed to said fixing wall of the frame;
- the motor of the means for driving in translation is disposed so as to be offset longitudinally along the axis of the reference body with respect to the motor rotating the cutting tool, the motor driving the cutting tool, received in the first eccentric, being positioned in an intermediate position between the cutting tool and the motors of the first drive means, of the second drive means and of the means for driving in translation, and wherein the motor of the means for driving in translation is also, at least partially, overlapping radially with respect to the radius of the external cylindrical wall of the second eccentric;
- the motor of the means for driving in translation has one or more of the following characteristics:
  - low-voltage motor, in particular below 48 volts,
  - brushless electric motor,
  - external-rotor motor,
  - weight-to-power ratio greater than 5 W/g,
  - using a magnet technology with a high Curie point, in particular substantially equal to approximately 200°,
  - having winding wires the insulators of which can withstand temperatures of 180° C.;
- the motor rotating the cutting tool on itself comprises a stator and a rotor, the cutting tool being mounted in direct drive on said rotor of said motor rigidly secured to the rotor;
- the motor rotating the cutting tool on itself comprises connection means, designed to be connected to an energy supply, in order to supply said motor with energy, said connection means being disposed at a rear longitudinal end of the motor, opposite to the cutting tool, and a connection finger is provided, configured to receive in connection said connection means of the motor in order to provide the connection of said energy source to the motor, said connection finger being connected to the frame by means of guide means, configured so as to allow a rotation of the connection finger with respect to the frame about a rotation axis, with a limited angular movement, combined with a translation of said rotation axis in a direction substantially perpendicular to the rotation axis over a limited distance so as to substantially immobilize the motor with respect to rotation about the axis of rotation of the cutting tool on itself, with a limited angular movement, by means of the connection means.

The invention will be understood better from a reading of the following description accompanied by the drawings, among which:

DESCRIPTION OF THE PREFERRED EMBODIMENTS

The present disclosure relates to an orbital drilling method for producing a drilling in a part, comprising the steps:
(a) provision of an orbital drilling device 1 comprising, on the same frame 10:
a motor 11,
a cutting tool 12, rotated on itself by said motor 11, about the rotation axis A12 thereof,
a first, interior, eccentric 13, comprising a hollow cylindrical body receiving said motor 11, said first eccentric 13 being configured so as to be mounted so as to be able to rotate with respect to the motor 11, said motor 11 itself being configured so as to be mounted substantially rotationally immobile with respect to the frame 10 about the axis A12 of rotation of the cutting tool 12 on itself, said hollow cylindrical body comprising an internal cylindrical wall 13$i$ of axis A13$i$, an external cylindrical wall 13$e$ of axis A13$e$, the axis A13$i$ of the internal cylindrical wall 13$i$ being offset by a distance E13 with respect to the axis A13$e$ of the external cylindrical wall 13$e$,
a second, outer, eccentric 14, comprising a hollow cylindrical body receiving the first eccentric 13, mounted so as to be able to rotate with respect to the second eccentric 14, the second eccentric comprising an internal cylindrical wall 14$i$ of axis A14$i$, and an external cylindrical wall 14$e$ of axis A14$e$, the axis A14$i$ of the internal cylindrical wall 14$i$ being offset by a distance E14 with respect to the axis A14$e$ of the external cylindrical wall 14$e$,
a reference body 15, secured to the frame 10, comprising an internal cylindrical wall 15$i$ of axis A15, receiving the second eccentric 14 mounted so as to be able to rotate with respect to the reference body 15,
a first drive means 130 configured to rotate the first eccentric 13 with respect to the frame 10,
a second drive means 140, distinct from the first drive means 130, configured to rotate the second eccentric 14 with respect to the frame 10,
(b) production of a drilling to the required shape and dimensions through the travel by the cutting tool 12 of a given path T with:
rotation of the cutting tool 12 about the axis A12 thereof by the action of the motor 11,
continuous and simultaneous rotations of the first eccentric 13 with respect to the frame 10 by the first drive means 130 at a rotation speed ω13, and of the second eccentric 14 with respect to the frame at a rotation speed ω14 by the second drive means 140, so that the cutting tool 12 also makes a rotation R12 about the axis A15 of the reference body 15 of radius D12, corresponding to the distance separating the axis A15 of the reference body 15 from the axis A12 of rotation of the cutting tool 12 on itself, and
continuous and simultaneous control of the angular position Θ13 and of the rotation speed ω13 with respect to the frame 10 of the first eccentric 13, and of the angular position Θ14 and of the rotation speed ω14 with respect to the frame 10 of the second eccentric 14, so that the cutting tool 12 follows said given path T, situated in a zone Z12 defined between the circle C, centered on the axis A15 and of radius |E13-E14|, and the circle C', centered on the axis A15 and of radius E13+E14,
and wherein the method is suitable for reproducing any path T of the cutting tool 12 in said zone Z12 by continuous control of the angular offset Θ14-Θ13 between the angular position Θ13 with respect to the frame 10 of the first eccentric 13 and the angular position Θ14 with respect to the frame 10 of the second eccentric 14.

Thus, by virtual of such a method, it is possible to adjust in real time, during the operation of drilling the part, the orbital path of the cutting tool 12 around the axis A15 of the reference body, so that it follows the path T determined for obtaining the required shape of the drilling.

Figure 4:
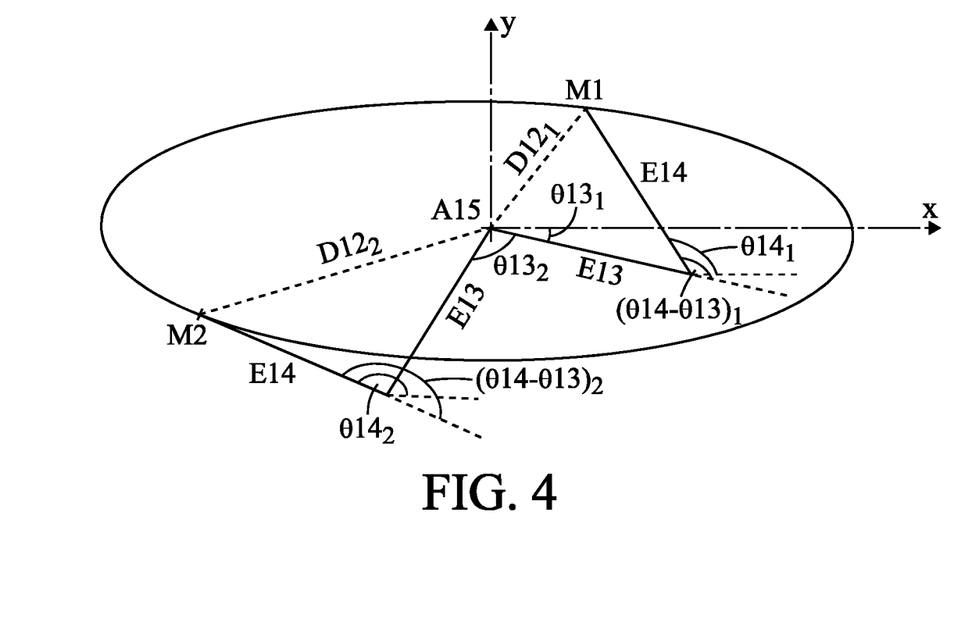
FIG. 4 is a plan view of an elliptically shaped path followed by the cutting tool during the orbital drilling method implemented by a drilling device according to an embodiment in accordance with the invention.

As can be seen in FIG. 4, the angular offset Θ14-Θ13 between the two eccentrics 13, 14 will directly determine the characteristics of the orbital path T travelled by the cutting tool 12 during the orbital drilling method.

Figures 5, 6, 7:
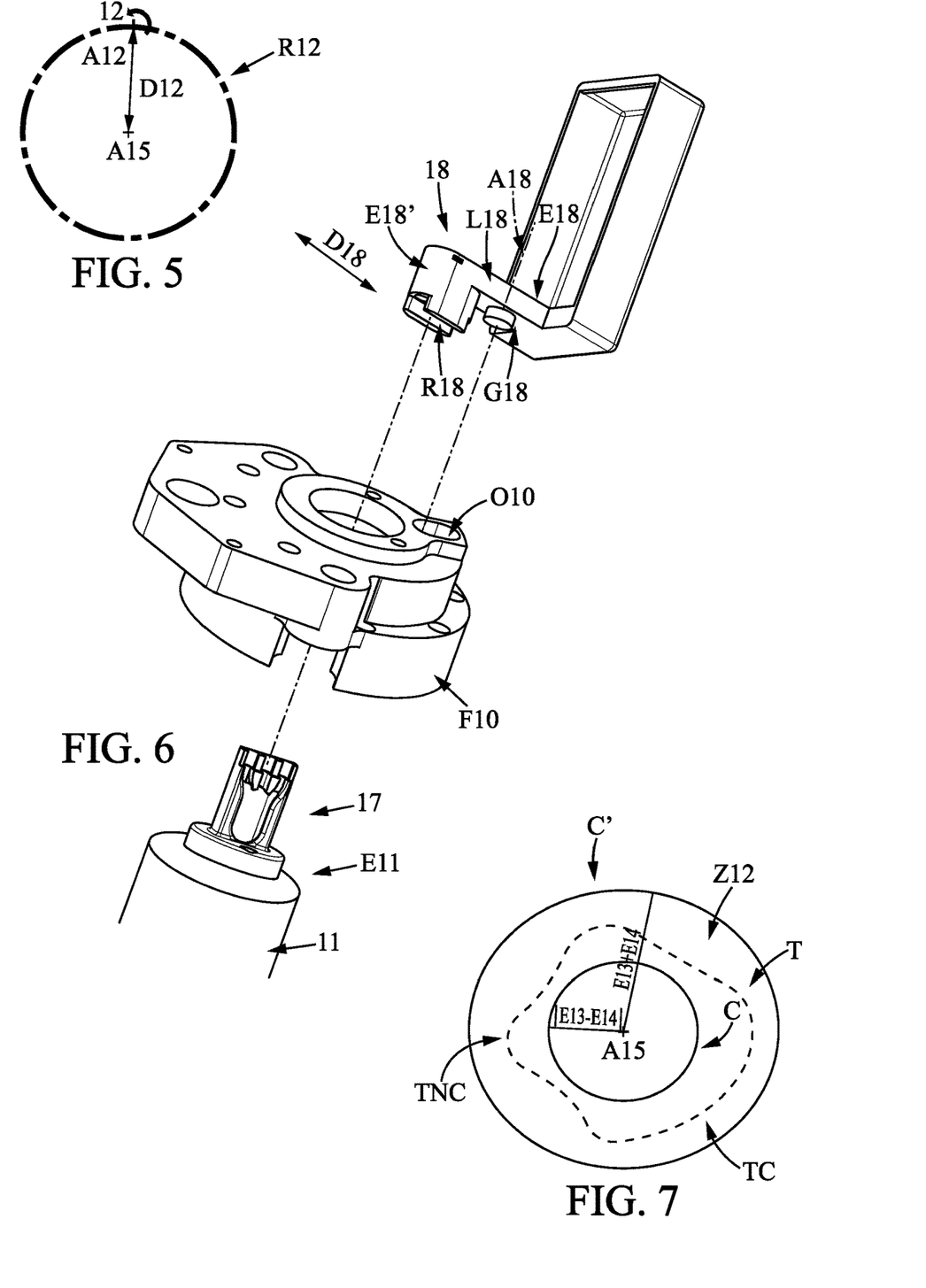
FIG. 5 shows schematically a possibility of a path travelled by the cutting tool during the orbital drilling method implemented by a drilling device according to one embodiment of the invention.
FIG. 6 is an exploded perspective view of the means for connecting the motor, of the fixing wall of the frame and of the connection finger of the orbital drilling device of the figure.
FIG. 7 shows schematically the zone in which the path followed by the cutting tool can be situated during the orbital drilling method implemented by a drilling device according to an embodiment in accordance with the invention.

As can be seen on the example embodiment in FIG. 7, it is thus possible to produce drillings in a part with a great variety of given shapes, included in said zone Z12, for example a disk, an annulus or a straight line, by way of non-limitative examples.

As can be seen on the example embodiment in FIG. 4, the angular offset Θ13 of the first eccentric 13 with respect to the frame 10 corresponds to the inclination of the straight line passing through the axis A13$i$ of the internal wall 13$i$ and the axis A13$e$ of the external wall 13$e$ with respect to a reference horizontal axis A15X of the frame 10, while the angular offset Θ14 of the second eccentric 14 with respect to the frame 10 corresponds to the inclination of the straight line passing through the axis A14$i$ of the internal wall 14$i$ and the axis A14$e$ of the external wall 14$e$ with respect to a reference horizontal axis A15X of the frame 10.

As can be seen in FIG. 5, during the orbital drilling method, the cutting tool 12, and more particularly the cutting edges thereof, can follow an orbital path resulting from the combination of:
a rotation of the cutting tool 12 about the axis A12 thereof, and
a rotation R12 of the cutting tool 12 about the axis A15 of the reference body 15, offset radially with respect to the axis A12 of the cutting tool 12.

The radial offset D12 between the axis A12 of rotation of the cutting tool 12 on itself and the axis A15 of the reference body 15 corresponds to the radius D12 of the rotation R12.

Thus, by modifying the angular offset Θ14-Θ13 between the first eccentric 13 and the second eccentric 14, it is possible to vary the relative positions thereof, and therefore the radius D12 of the rotation R12 of the cutting tool 12, defining the path followed by the cutting tool 12.

Advantageously, the control of the angular offset Θ14-Θ13 and of the rotation speed ω13 of the first eccentric 13 with respect to the frame 10 and of the rotation speed ω14 of the second eccentric 14 with respect to the frame 10 can be achieved dynamically during the drilling method by control means, comprising for example an electronic control circuit (not visible in the figures). Said control circuit may for example be housed in a casing secured to the frame 10.

The cutting tool 12 may for example be a milling cutter.

The motor 11 may be cylindrical in shape and, in order to facilitate the control of the method, be an electric motor.

Advantageously, the electric motor 11 comprises a stator and a rotor, said motor 11 being for example an external-rotor motor, in order to have a high drive torque.

In order to facilitate the rotation of the first eccentric 13 with respect to the second eccentric 14 and/or of the second eccentric 14 with respect to the reference body 15 of the frame 10, bearings (not shown) may be provided between the external wall 13e of the first eccentric 13 and the internal wall 14i of the second eccentric 14, and respectively between the external wall 14e of the second eccentric 14 and the internal wall 15i of the reference body 15.

Alternatively, the rotation speeds ω13 of the first eccentric 13 with respect to the frame 10 and ω14 of the second eccentric 14 with respect to the frame 10 remain low compared with the speed of rotation of the tool 12 about the axis A12 thereof, no additional guide means is provided between the external wall 13e of the first eccentric 13, and the internal wall 14i of the second eccentric 14 caused to slide one on the other and/or between the external wall 14e of the second eccentric 14 and the internal wall 15i of the reference body 15 caused to slide one on the other, the first eccentric 13, the second eccentric 14 and/or the reference body 15 being configured as plain bearings, that is to say manufactured with manufacturing tolerances such that, and in materials such that, the friction between the various interaction surfaces thereof is minimal.

The first eccentric 13 and the second eccentric 14 may thus be single-piece parts, for example made from bronze, or made from an alloy based on bronze, or a steel or an alloy based on steel.

The rotation speed ω13 of the first eccentric 13 with respect to the frame 10 and the rotation speed ω14 of the second eccentric 14 with respect to the frame 10 are determined according to the various angular positions Θ13, Θ14 adopted by the first eccentric 13 and by the second eccentric 14 for the travel of the cutting tool 12 of said given path T and by the speed of rotation of the cutting tool 12 about the axis A15 so as to allow the drilling in the part with satisfactory manufacturing quality.

According to one embodiment, in the method:

a plurality of points $M_n$ is defined, belonging to said given path T, and, for each point $M_n$, the angular position Θ13$_n$ of the first eccentric 13 with respect to the frame 10 and the angular position Θ14$_n$ of the second eccentric 14 with respect to the frame 10 are determined, enabling the cutting tool 12 to reach each of the points $M_n$ on the path T during its rotation about the axis A15 of the reference body 15, and the angular position Θ13 and the rotation speed ω13 with respect to the frame 10 of the first eccentric 13, and the angular position Θ14 and the rotation speed ω14 with respect to the frame 10 of the second eccentric 14 are controlled continuously, with control of the angular offset Θ14-Θ13, so that the cutting tool 12 passes through each of the points $M_n$ on the path T during its rotation about the axis A15 of the reference body 15.

The table below shows various points $M_n$ on the path T travelled by the cutting tool 12 for producing an elliptically shaped drilling, shown on the example embodiment in FIG. 4, with, for each of said points $M_n$:

the angular position Θ13$_n$ of the first eccentric 13 with respect to the frame 10, the angular position Θ14$_n$ of the second eccentric 14 with respect to the frame 10, the angular offset (Θ14-Θ13)$_n$ between the first eccentric 13 and the second eccentric 14, the rotation speed ω13$_n$ of the first eccentric 13 with respect to the frame 10, the rotation speed ω14$_n$ of the second eccentric 14 with respect to the frame 10, the radius D12$_n$ of the rotation R12 of the cutting tool 12 about the axis A15 of the reference body 15.

| Point | Θ13 | Θ14 | Θ14-Θ13 | ω13 | ω14 | D12 |
|---|---|---|---|---|---|---|
| $M_1$ | Θ13$_1$ | Θ14$_1$ | (Θ14-Θ13)$_1$ | ω13$_1$ | ω14$_1$ | D12$_1$ |
| $M_2$ | Θ13$_2$ | Θ14$_2$ | (Θ14-Θ13)$_2$ | ω13$_2$ | ω14$_2$ | D12$_2$ |
| $M_n$ | Θ13$_n$ | Θ14$_n$ | (Θ14-Θ13)$_n$ | ω13$_n$ | ω14$_n$ | D12$_n$ |

In order to obtain a drilling with regular contours, it may be advantageous to define a large number of points Won said given path T.

According to one embodiment, the separation E13 between the axis A13i of the internal wall 13i and the axis A13e of the external wall 13e of the first eccentric 13 is equal to the separation E14 between the axis A14i of the internal wall 14i and the axis A14e of the external wall 14e of the second eccentric 14. The radius D12 of the rotation R12 of the cutting tool 12 about the axis A15 of the reference body 15 can thus take a zero value, when the absolute value of the radial offset Θ14-Θ13 is equal to 180°. The method is thus suitable for reproducing any path T of the cutting tool 12 in said zone Z12 forming a disk, centered on the axis A15 of the reference body 15, of radius E13+E14.

Thus the radius D12 of the rotation of the cutting tool 12 about the axis A15 of the reference body 15 may vary between a zero value and a maximum value corresponding to the radius E13+14 of the circle C' defining said zone Z12.

When the radius D12 of the rotation R12 is zero, the path T traveled by the cutting tool 12 comprises only the rotation of the cutting tool 12 on itself and allows the production of drillings the diameter of which corresponds substantially to that of the cutting tool 12.

In such an embodiment, in order to obtain a zero radius D12, it suffices to position the first eccentric 13 so that the axis A14e of the external wall 14e of the second eccentric 14 coincides with the axis A13i of the internal wall 13i of the first eccentric 13. The eccentricity of the second eccentric 14 and of the first eccentric 13 will then cancel each other out, and the axis A12 of rotation of the cutting tool 12 on itself coincides then with the axis A14e of the external wall 14e of the second eccentric 14.

The minimum value of said radius D12 corresponds to an angular offset Θ14-Θ13 of absolute value 180° while the maximum value of the radius D12 corresponds to an angular offset Θ14-Θ13 of zero value.

By way of indication, the eccentricity E13 of the first eccentric 13 may be between 0.1 and 1 mm.

By way of indication, the eccentricity E14 of the second eccentric 14 may be between 0.1 and 1 mm.

According to one embodiment, the given path T comprises, at least on one section, a circular path TC, and in the method the angular position Θ13 and the rotation speed ω13 of the first eccentric 13 with respect to the frame 10 and the angular position Θ14 and the rotation speed ω14 of the second eccentric 14 with respect to the frame 10 are controlled, so that the angular offset Θ14-Θ13 remains constant during the rotation of the cutting tool 12 about the axis A15 of the reference body 15 so that the cutting tool 12 describes a rotation R12 about the axis A15 of the reference body 15 of constant radius D12 and follows said circular path TC.

By virtue of this advantageous provision, it is possible to produce a drilling comprising at least one section in disk form or in annulus form.

According to an embodiment, the given path T comprises, at least over one section, a non-circular path TNC, and wherein the angular position Θ13 and the rotation speed ω13 of the first eccentric 13 with respect to the frame 10 and the angular position Θ14 and the rotation speed ω14 of the second eccentric 14 with respect to the frame 10 are controlled so that the angular offset Θ14-Θ13 varies during the rotation of the cutting tool 12 about the axis A15 of the reference body 15 so that the cutting tool 12 describes a rotation R12 about the axis A15 of the reference body 15 of variable radius D12 and follows said non-circular path TNC.

Thus, as can be seen on the example embodiment in FIG. 7, the path T may comprise at least one circular section TC and one non-circular section TNC for producing drillings of complex shape.

By virtue of this advantageous provision, it is then possible to produce a drilling with a complex shape, including at least one non-circular section in a simple fashion, without having recourse to complex kinematics, providing for example the use of a table XY, with the complex command.

According to one embodiment, the orbital drilling device 1 further comprises means 16 for driving the cutting tool 12 in translation, in a direction parallel to the axis A12 of rotation of the cutting tool 12 on itself, in order to allow the translational movement of the cutting tool 12.

According to this embodiment, the means 16 for driving in translation comprise a screw/nut system, comprising a threaded rod 161 rotated by means of a motor 162 and a nut mounted so as to be able to move in translation with respect to the frame 10, said threaded rod 162 being received in said nut.

According to this embodiment, the cutting tool 12 is driven in translation by means of the means 16 for driving in translation during the step (b) of the method.

Figure 1:
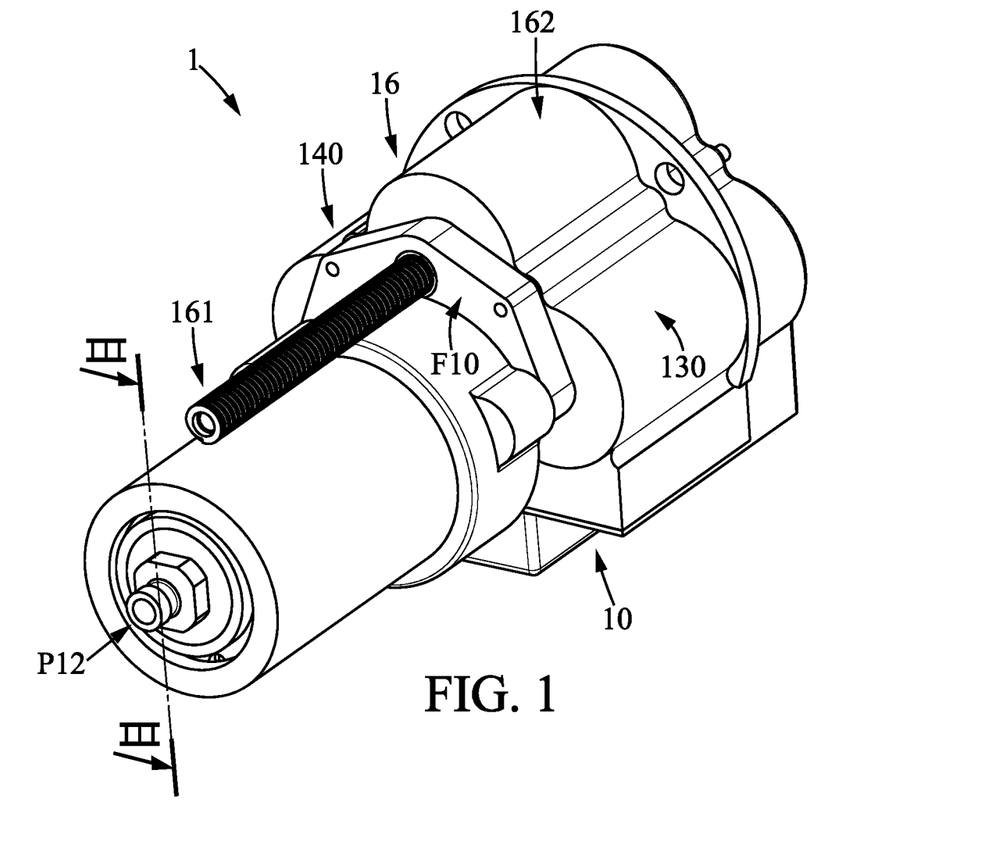
FIG. 1 is a perspective view of the drilling device according to an embodiment in accordance with the invention.
Figure 3:
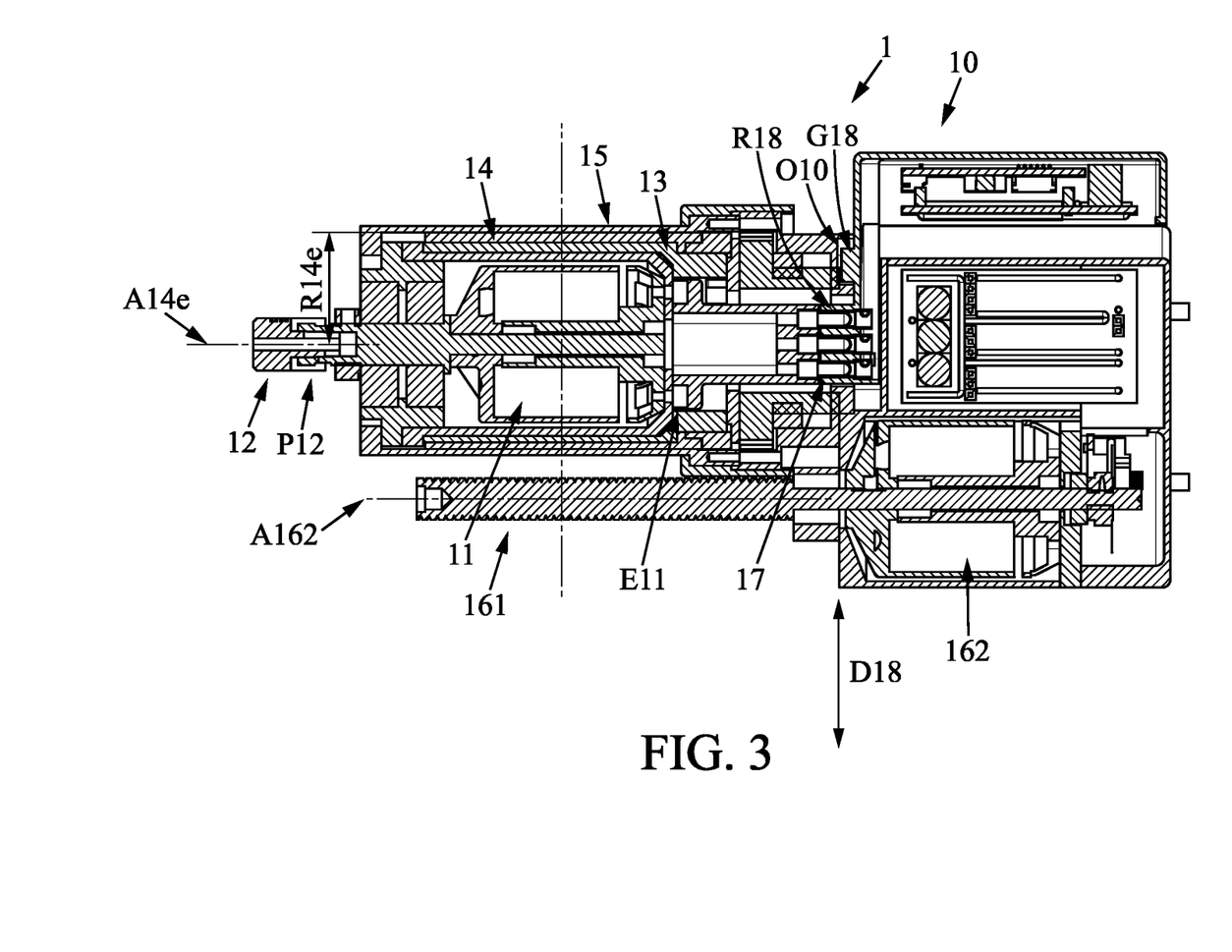
FIG. 3 is a view in cross-section along the line of the device of FIG. 1.

As can be seen more particularly on the example embodiment in FIGS. 1 and 3, said screw 161 is disposed parallel to the rotation axis A12 of the motor 11, corresponding to the axis A12 of rotation of the cutting tool 12 on itself.

The nut of said screw/nut system is designed to be disposed on an element distinct from the orbital drilling device 1 according to the invention, and in particular distinct from the frame 10 of the orbital drilling device 1.

The use of such a screw/nut system makes it possible to obtain a drilling to the required depth, in a precise fashion.

The invention relates to an orbital drilling device 1 comprising, on the same frame 10:
  a motor 11,
  a cutting tool 12 rotated on itself by said motor 11, about its rotation axis A12,
  a first, inner, eccentric 13, comprising a hollow cylindrical body receiving said motor 11, the first eccentric 13 being configured to be mounted so as to be able to move with respect to the motor 11, said motor 11 being configured so as to be mounted rotationally immobile with respect to the frame 10 about the axis A12 of rotation of the cutting tool 12 on itself, the first eccentric 13 comprising an internal cylindrical wall 13i of axis A13i and an external cylindrical wall 13e of axis A13e, the axis A13i of the internal cylindrical wall 13i being offset by a distance E13 with respect to the axis of the external cylindrical wall,
  a second, outer, eccentric 14, comprising a hollow cylindrical body receiving the first eccentric 13, mounted so as to be able to rotate with respect to the second eccentric 14, the second eccentric 14 comprising an internal cylindrical wall 14i of axis A14i and an external cylindrical wall 14e of axis A14e, the axis A14i of the internal cylindrical wall 14i being offset by a distance E14 with respect to the axis A14e of the external cylindrical wall 14e,
  a reference body 15, secured to the frame 10, comprising an internal cylindrical wall 15i of axis A15, receiving the second eccentric 14 mounted so as to be able to rotate with respect to the reference body,
  a first drive means 130, configured to rotate the first eccentric 13 with respect to the frame 10, at a rotation speed ω13,
  a second drive means 140 configured to rotate the second eccentric with respect to the frame 10 at a rotation speed ω14, simultaneously with the rotation of the first eccentric 13 with respect to the frame 10,
  control means configured for producing a drilling to the required shape and dimensions by the travel of the cutting tool 12 on a given path T, by performing the following steps:
    rotation of the cutting tool 12 on itself about the rotation axis A12 thereof,
    continuous and simultaneous rotations of the first eccentric 13 with respect to the frame 10 at a rotation speed ω13, and of the second eccentric 14 with respect to the frame 10 at a rotation speed ω14 so that the cutting tool 12 also performs a rotation R12 about the axis A15 of the reference body 15 with a radius D12 corresponding to the distance separating the axis A15 of the reference body 15 from the axis of rotation of the cutting tool 12 on itself, and
    continuous and simultaneous control of the angular position Θ13 and of the rotation speed ω13 with respect to the frame 10 of the first eccentric 13, and of the angular position Θ14 and of the rotation speed ω14 with respect to the frame 10 of the second eccentric 14, so that the cutting tool 12 follows said given path T, situated in a zone Z12 defined between the circle C, centered on the axis A15 and of radius |E13-E14|, and the circle C', centered on the axis A15 and of radius E13+E14.

According to the invention, said control means are suitable for reproducing any path T of the cutting tool 12 in said zone Z12 by continuous control, during the drilling, of the angular offset Θ14-Θ13, between the angular position Θ13 with respect to the frame 10 of the first eccentric 13 and the angular position Θ14 with respect to the frame 10 of the second eccentric 14.

Such an orbital drilling device 1 is able to implement the method described previously.

Thus all the provisions and advantages described previously relating to the orbital drilling device 1 implementing the orbital drilling method described previously, and provided during the steps (a) and (b) of said method, apply to the orbital drilling device 1 according to the invention.

Such an orbital drilling device 1, visible for example in FIGS. 1 and 3, may for example be provided as a removable device, for example portable, able to be carried and manipulated by an operator. An additional frame (not shown) may then be provided in order to improve the ergonomics of the orbital drilling device 1 and facilitate the manipulation thereof.

Alternatively, such an orbital drilling device 1 may be designed so as to be disposed on a machine tool, or on a robotic arm, using suitable fixing means.

Figure 2A:
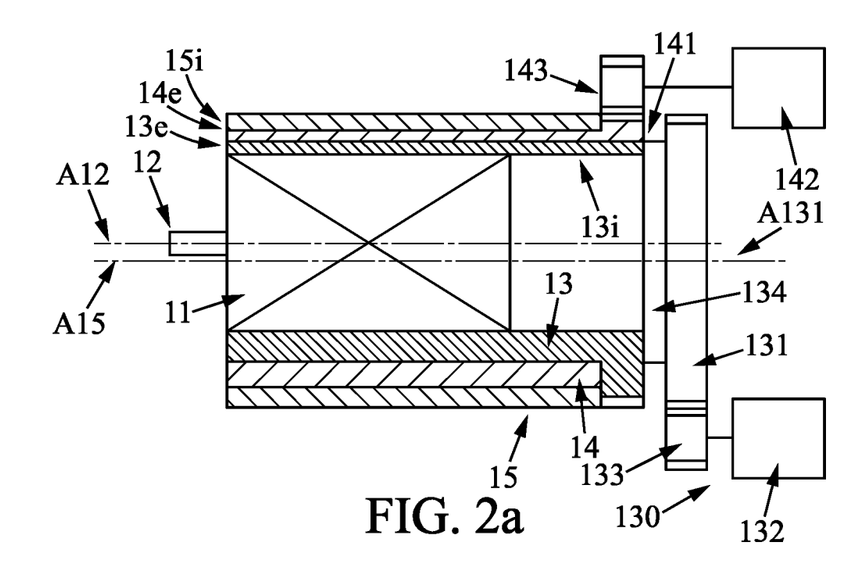
FIG. 2a is a schematic representation in cross-section of a portion of the drilling device according to an embodiment in accordance with the invention.
Figure 2B:
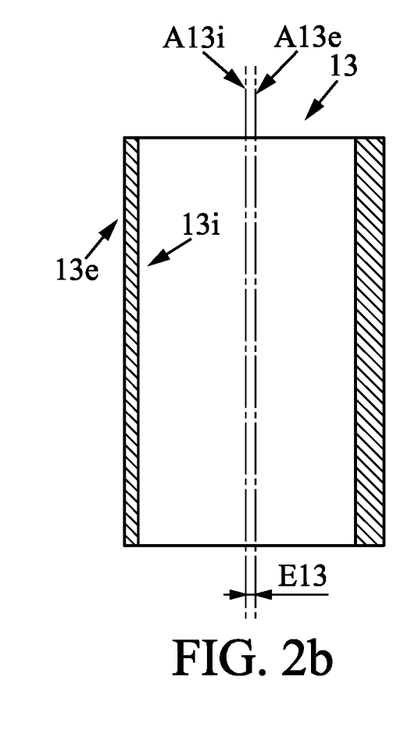
FIG. 2b is a schematic representation in cross-section of the first eccentric of the drilling device of FIG. 2.
Figure 2C:
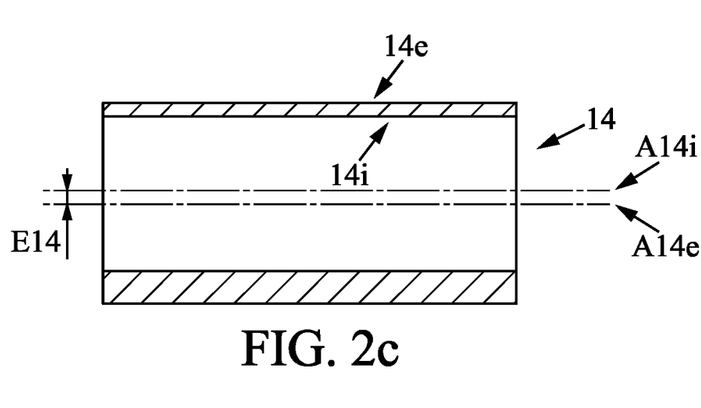
FIG. 2c is a schematic representation in cross-section of the second eccentric of the drilling device of FIG. 2.

As can be seen on the example embodiment in FIGS. 1, 2a and 3, the motor 11 driving the cutting tool 12 about the rotation axis A12 thereof may be housed entirely in the first eccentric 13, i.e. without extending radially or longitudinally outside the latter, so as advantageously to reduce the longitudinal size of the orbital drilling device 1 according to the invention, along the axis A15 of the reference body 15, and in particular compared with the devices described in the documents US 2003/0017017 A1 and WO 2004/113002 A1, wherein the motor rotating the cutting tool projects longitudinally from the inner cylindrical body to great extent, on the rear part of the orbital drilling device, namely opposite to the cutting tool.

The fact that the motor 11 rotating the cutting tool 12 is housed, in particular entirely, in the first eccentric 13, can advantageously make it possible for the motor 11 not to encroach on the rear part of the reference body 15, on which the first drive means 130 and the second drive means 140 can be disposed, limiting the longitudinal size along the axis A15 of the reference body 15, but even more advantageously the radial size, in a radial direction with respect to the axis A15 of the reference body 15.

According to one embodiment, the first drive means 130 comprises a first peripheral toothed ring 131, mounted so as to rotate about the axis of the reference body 15, constrained to rotate with the first eccentric 13, and a motor 132, secured to the frame 10, with a toothed pinion 133 mounted on the drive shaft of the motor 132 meshing with said first toothed ring 131, the first toothed ring 131 and the first eccentric 131 being secured together by means of an Oldham coupling 134 in order to compensate for any misalignment between the first toothed ring 131 and the first eccentric 13.

This advantageous provision of the invention makes it possible to provide the rotational driving of the first eccentric 13 with respect to the frame 10 in a way that is precise and reliable over time, and in particular compared with the devices of the prior art employing a transmission belt, which makes it possible to precisely adjust the angular position Θ13 and the rotation speed ω13 of the first eccentric 13 with respect to the frame 10, as well as the relative position thereof with respect to the second eccentric 14, and therefore the radius D12 of the rotation R12 of the cutting tool 12 about the axis A15 of the reference body 15.

As can be seen on the example embodiment in FIG. 2a, by virtue of this advantageous provision of the invention, the position of the axis of rotation A131 of the toothed ring 131 on itself remains fixed with respect to the axis of rotation A133 of the toothed pinion 133 on itself, while the position of the rotation axis A13i of the first eccentric 13 with respect to the frame 10 varies with respect to the axis of rotation A131i of the toothed ring 131 on itself.

The Oldham coupling makes it possible to transmit the rotation movement of said toothed ring 131 to the first eccentric 13, by compensating for the offset between the rotation axis A131 of the toothed ring 131 and the rotation axis A13i of the first eccentric 13.

The use of an Oldham coupling makes it possible to reduce the size of such an orbital drilling device 1, in particular in comparison with the use of a double Cardan joint, or by comparison with the movement transmission system of particularly complex design employed in the drilling device described in the document WO 2004/113002 A1.

According to one embodiment, the second drive means 140 comprises a second peripheral toothed ring 141, secured to and coaxial with the external cylindrical wall 14e of the second eccentric 14 and a motor 142 with a toothed pinion 143 mounted on the drive shaft of the motor and meshing with said toothed ring 141.

This advantageous provision of the invention makes it possible to provide the rotational driving of the second eccentric 14 with respect to the frame 10 in a way that is precise and reliable over time, and in particular compared with the devices of the prior art employing a transmission belt, which makes it possible to precisely adjust the angular position Θ14 and the rotation speed ω14 of the second eccentric 14 with respect to the frame 10, as well as the relative position thereof with respect to the first eccentric 13, and therefore the radius D12 of the rotation R12 of the cutting tool 12 about the axis A15 of the reference body 15.

Said toothed ring 141 can be provided in a single piece with the external wall 14e of the second eccentric 14, or be produced in the form of a separate part.

In order to facilitate the control of the orbital drilling device 1 according to the invention, the motor 132 of the first drive means 130 and the motor 142 of the second drive means 140 may be electric motors, for example identical, or even identical to the motor 11 rotating the cutting tool 12 on itself.

Also, as can be seen on the example embodiments in FIGS. 1, 2a, 3 and 8, the use of toothed rings 131, 141 cooperating with toothed pinions 133, 143 makes it possible to reduce the radial offset between the rotation axes A132, A142 of each of the rotors of the motors 132, 142 and the rotation axis A12 of the motor 11, in a radial direction of the first eccentric 13 or of the second eccentric 14.

The use of gear wheels advantageously makes it possible to reduce the radial size of the drilling device 1 according to the invention, and in particular compared with the drilling devices employing a motor cooperating with a belt and a pulley, as described in the documents US 2003/0017017 A1 or WO 2004/113002 A1.

According to one embodiment, the motor 132 of the first drive means 130 and the motor 142 of the second drive means 140 are fixed to the same fixing wall F10, secured to the frame 10.

Advantageously, and in order to balance the distribution of the weight of the motors 132, 142 on the frame 10, the motor 132 of the first drive means 130 and the motor 142 of the second drive means 140 are disposed with their drive shafts A132, A142 parallel, and on either side, at equal distances from the axis A15 of the reference body 15.

Also, as can be seen on the example embodiment in FIG. 1, and when the motors 132, 142 of the first and second drive means 13, 14 are in particular identical, in order to reduce the longitudinal size of the drilling device 1 according to the invention, said motors 132, 142 of the first and second drive means 13, 14 may be provided so as to be juxtaposed longitudinally along the axis A15 of the main body 15, completely or partially overlapping along said axis A15.

According to one embodiment, the first toothed ring 131 of the first drive means 130 and the second toothed ring 141 of the second drive means 140 are identical, having the same diameter, the same number of teeth, and the same tooth pitch and profile.

In the same way, if the motors 132, 142 are disposed on either side of the axis A15 of the reference body 15, and at equal distances from the axis A15 of the reference body, and the pinions 133, 143, mounted on their respective drive shafts, may also be identical, having the same diameter, the same number of teeth, and the same tooth pitch and profile.

Thus the adjustment of the angular positions Θ13, Θ14 and the rotation speeds ω13 and ω14 is easier to control, in that the rotation speeds ω13 and ω14 will be identical for identical rotation speeds of the drive shafts A132, A142 of the motors 132, 142.

According to one embodiment, the motor 132 of the first drive means 130 and the motor 142 of the second drive means 140 may advantageously be disposed so as to be offset longitudinally, along the axis A15 of the reference body 15, with respect to the motor 11 rotating the cutting tool 12, the motor 11 driving the cutting tool 12, received in the first eccentric 13, being positioned in a longitudinal position intermediate between the cutting tool 12 and the motors 132, 142 of the first drive means 130 and of the second drive means 140, the motor 132 of the first drive means 130 and the motor 142 of the second drive means 140 each at least partially overlapping radially with respect to the radius R14e of the external cylindrical wall 14e of the second eccentric 14.

Figure 8:
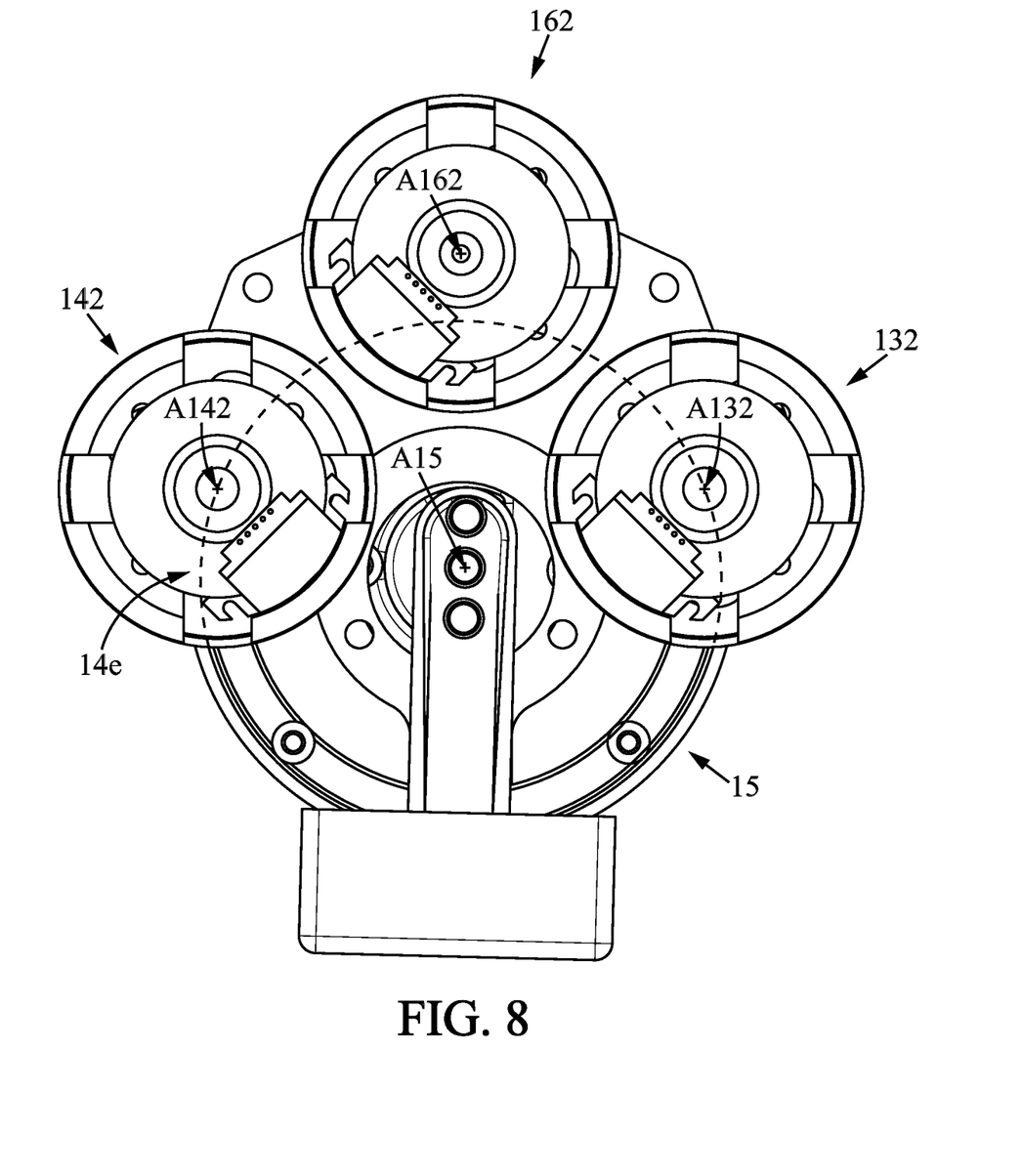
FIG. 8 shows a plan view of the drilling device of FIG. 1.

Thus, as can be seen on the example embodiments in FIGS. 1, 3 and 8, this advantageous provision of the invention, the radial size of the drilling device 1 according to this embodiment of the invention, in a radial direction with respect to the axis A15 of the reference body 15, can be reduced by bringing closer together the rotation axes A132, A142 of the motors 132, 142 of the first 130 and second drive means 140 and the rotation axis A12 of the motor 11 rotating the cutting tool 12, and in particular compared with the drilling devices of the prior art using motors cooperating with a belt and pulley for driving the eccentrics, such as for example those described in the documents US 2003/0017017 A1 and WO 2004/113002 A1, for which such a radial overlap is not possible.

According to one embodiment, the motor 132 of the first drive means 130 and/or the motor 142 of the second drive means 140 has one or more of the following characteristics:
low-voltage motor, in particular below 48 volts,
brushless electric motor,
external-rotor motor,
weight-to-power ratio greater than 5 W/g,
using a magnet technology with a high Curie point, in particular substantially equal to approximately 200°,
having winding wires the insulators of which can withstand temperatures of 180° C.

The use of a motor 132, 142 with an external rotor makes it possible in particular to benefit from a high drive torque while minimizing the size of such a motor 132, 142. A motor 132, 142 with one or other of the above characteristics, and in particular with all these characteristics, has in particular reduced dimensions and reduced weight, which advantageously makes it possible to reduce the longitudinal size along the axis A15 of the reference body 15, and in a radial direction with respect to the axis A15 of the reference body 15 of the drilling device 1 according to the invention, while facilitating manipulation thereof and guaranteeing a driving of the first eccentric 13 and/or of the second eccentric 14 with sufficient power for optimum functioning of the drilling device 1 according to the invention, and with reduced energy consumption, which reduces the operating cost of the drilling device 1 according to the invention, and in particular compared with the drilling devices of the prior art, such as for example those described in the documents US 2003/0017017 A1 or WO 2004/113002.

According to one embodiment, said orbital drilling device 1 further comprises means 16 for driving the cutting tool 12 in translation, in a direction parallel to the axis A12 of rotation of the cutting tool 12 on itself, in order to allow the translational movement of the cutting tool 12.

According to one embodiment, the means 16 for driving in rotation comprise a screw/nut system, comprising a threaded rod 161 rotated by means of a motor 162 and a nut able to move in translation with respect to the frame 10, said threaded rod 161 being received in said nut.

The motor 162 may be connected to a control means, for example an electronic control circuit, for controlling the rotation of the motor 162 so as to obtain the translational movement of the cutting tool 12 over a required distance, in order to obtain the required drilling depth.

Advantageously, and in order to facilitate the control of the orbital drilling device according to the invention, the motor 162 may be an electric motor.

According to one embodiment, the motor 162 of the translational drive means is fixed to said fixing wall F10 of the frame 10.

According to one embodiment, the motor 162 of the translational drive means 16 is disposed so as to be offset longitudinally, along the axis A15 of the reference body 15, with respect to the motor 11 rotating the cutting tool 12, the motor 11 driving the cutting tool 12, received in the first eccentric 13, being positioned in an intermediate position between the cutting tool 12 and the motors 132, 142, 162 of the first drive means 130, of the second drive means 140 and of the translational drive means 160, the motor 162 of the translational drive means 16 also at least partially overlapping radially with respect to the radius R14e of the external cylindrical wall 14e of the second eccentric 14.

Thus, as can be seen on the example embodiments in FIGS. 1, 3 and 8, by virtue of this advantageous provision of the invention, the radial size of the drilling device 1 according to the invention, in a radial direction with respect to the axis A15 of the reference body 15, can be reduced by enabling a bringing closer together of the rotation axis A162 of the motor 162 of the translational drive means 16 and the rotation axis A12 of the motor 11 rotating the cutting tool 12, and in particular compared with the drilling devices of the prior art using motors cooperating with a belt and pulley for driving the eccentrics, such as for example those described in the documents US 2003/0017017 A1 and WO 2004/113002 A1, for which such a radial overlap is not possible.

Advantageously, the motor 162 of the translational drive means 16 may be identical to the motors 132, 142 of the first 130 and second drive means 140, or even identical to the motor 11 rotating the cutting tool 12 on itself.

Also, as can be seen on the example embodiments in FIGS. 1, 3 and 8, in order to reduce the longitudinal size of the drilling device 1 according to the invention, said motor 162 of the translational drive means 16 may be provided so as to be juxtaposed longitudinally along the axis A15 of the main body 15 with the motor 132, 142 of the first 13 and second drive means 14, completely or partially overlapping along the longitudinal axis with the motor 132, 142 of the first 13 and second drive means 14.

As can be seen on the example embodiment in FIG. 8, in order to reduce the size of the drilling device 1 according to the invention and to improve the balance thereof, with a uniform distribution of the weight, the motors 132, 142, 162 of the first 130 and the second drive means 140 and of the translational drive means 16 may be disposed on said fixing wall F10 of the frame 10 so that the rotation axes A132, A142, A162 of their respective rotors form an isosceles triangle, advantageously equilateral, with the center of gravity thereof disposed in proximity to, preferably substantially coinciding with, the axis A15 of the reference body 15.

According to one embodiment, the motor 162 of the translational drive means 16 has one or more of the following characteristics:
- low-voltage motor, in particular below 48 volts,
- brushless electric motor,
- external-rotor motor,
- weight-to-power ratio greater than 5 W/g,
- using a magnet technology with a high Curie point, in particular substantially equal to approximately 200°,
- having winding wires the insulators of which can withstand temperatures of 180° C.;

The use of a motor 162 with an external rotor make it possible in particular to benefit from a high drive torque while minimizing the size of such a motor 162. A motor 162 with one or other of the above characteristics, and in particular with all these characteristics, has in particular reduced dimensions, which makes it possible advantageously to reduce the longitudinal size along the axis A15 of the reference body 15, and in a radial direction with respect to the axis A15 of the reference body 15 of the drilling device 1 according to the invention, while guaranteeing driving of the cutting tool 12 with sufficient power for optimum functioning of the drilling device 1 according to the invention and with reduced energy consumption, which reduces the operating cost of the drilling device 1 according to the invention, and in particular compared with the drilling devices of the prior art, such as for example those described in the documents US 2003/0017017 A1 or WO 2004/113002.

According to one embodiment, the threaded rod 161 of the screw/nut system is mounted in direct drive on the rotor of the motor 16, rigidly secured to the rotor.

This advantageous provision of the invention makes it possible to improve the precision of the drilling obtained with the orbital drilling device 1 according to the invention, in that the uncertainties related to the use of transmission elements (such as gears, etc.) between the rotor of the motor 16 and the tool and the threaded rod 161 of the screw/nut system are thus avoided.

According to one embodiment, the motor 11 rotating the cutting tool 12 on itself comprises a stator and a rotor, the cutting tool 12 being mounted in direct drive on said rotor of said motor 11, rigidly secured to the rotor.

This advantageous provision of the invention makes it possible to improve the precision of the drilling obtained with the orbital drilling device 1 according to the invention, in that the uncertainties related to the use of transmission elements (such as gears, etc.) between the rotor of the motor 11 and the cutting tool 12 are thus avoided.

The cutting tool 12 may for example be fixed to the rotor of the motor 11 by means of a tool holder P12, as can be seen on the example embodiment in FIGS. 1 and 3.

According to one embodiment, the motor 11 rotating the cutting tool 12 on itself comprises connection means 17, designed to be connected to an energy supply, in order to supply said motor 11 with energy, said connection means 17 being disposed in proximity to a rear longitudinal end E11 of the motor 11, opposite to the cutting tool 12.

A connection finger 18 is provided, configured to receive as a connection said connection means 17 of the motor 11, in order to provide the connection of said energy source to said motor 11.

The connection finger 18 may be connected to the frame 10 by means of guide means G18, O10, configured so as to allow a rotation of the connection finger 18 with respect to the frame 10 about the rotation axis A18, with a limited angular movement, combined with a translation of said rotation axis A18 in a direction D18, substantially perpendicular to the rotation axis A18, over a limited distance, so as to substantially immobilize the motor 11 with respect to rotation about the axis A12 of rotation of the cutting tool 12 on itself, with a limited angular movement, by means of the connection means 17.

Limited angular movement means an angular movement of less than 30°, preferably less than 20°, and limited distance means a distance of less than 5 mm, preferably less than 2 mm, or advantageously corresponding to twice the maximum radius of eccentricity (E13+E14) of the cutting tool 12 around the axis A15 of the reference body 15.

By virtue of this advantageous provision of the invention, the stresses exerted on the flexible conduits, and in particular the electric wires, for the supply of energy at the connection finger 18 are limited, and they also do not risk winding on themselves, which prevents damage thereto, while enabling said connection finger 18 to follow the orbital movement, generated by the two eccentrics 13, 14, of the motor 11 around the axis A15 of the main body 15 during operation of the device 1 according to the invention, while substantially ensuring the immobilization of the motor 11 with respect to rotation about the axis A12 of rotation of the cutting tool 12 on itself, that is to say with a limited angular movement, by means of the connection means 17.

Because of this, it is not necessary to use complex and expensive rotary electrical connectors, unlike for example the device described in the document WO 2009/005446 A1.

As can be seen on the example embodiments in FIGS. 3 and 6, said connection finger 18 can be mounted on the fixing plate F10 of the frame 10. Said connection finger 18 comprises for example a longitudinal portion L18 with two longitudinal ends E18, E18'. At a first longitudinal end E18 of the longitudinal portion L18, the connection finger 18 may comprise a guide stud G18, substantially cylindrical in shape with its axis corresponding to the rotation axis A18, designed to be received in an oblong hole O10 provided on said fixing plate F10, the longitudinal direction of which advantageously corresponds to said translation direction D18, the diameter of the oblong hole O10 advantageously having a radius substantially identical to that of the guide stud 18.

The guide stud G18 and said oblong hole O10 thus advantageously constitute said guide means configured so that said guide stud G18 can slide along said oblong hole O10 over said limited distance, advantageously corresponding to the length of said oblong hole O10, while pivoting about the rotation axis A18 of the guide stud G18, in said limited angular movement.

At the second longitudinal end E18' of the longitudinal portion L18 of the connection finger 18, connection means may be disposed, and in particular electrical connection means, configured to receive in connection said connection means 17 in order to provide the energy supply by the source of energy, and in particular electrical energy, to the motor 11 by means of said connection means 17, and also to ensure substantially the immobilization of the motor 11 with respect to rotation about the axis A12 of rotation of the cutting tool 12 on itself, with a limited angular movement.

Advantageously, the angular movement of the connection finger 18 with respect to the frame 10 about the rotation axis A18 and the angular movement of the motor 11 about the axis A12 of rotation of the cutting tool 12 on itself, may for example be identical, and/or may each be less than 30°, preferably less than 20°, while the distance of movement in translation of the rotation axis A18 along the oblong hole O10 may, advantageously, correspond substantially to twice the maximum eccentricity ratio (E13+E14) of the cutting tool 12 around the axis A15 of the reference body 15, for example less than 5 mm, preferably between 0.2 mm and 2 mm.

Naturally, other embodiments could have been envisaged by a person skilled in the art without departing from the scope of the invention defined by the following claims.

LIST OF PARTS

1. Orbital drilling device
10. Frame
F10. Fixing wall
O10. Oblong hole
11. Motor
E11. Rear longitudinal end
12. Cutting tool
A12. Rotation axis
P12. Tool holder
R12. Rotation
D12. Radius
Z12. Zone
13. First eccentric
Θ13. Angular position
E13. Distance
13$i$. Internal wall
13$e$. External wall
A13$i$, A13$e$. Axis
130. First drive means
131. Toothed ring
132. Motor
A132. Rotation axis
133. Pinion
14. Second eccentric
Θ14. Angular position
E14. Distance
14$i$. Internal wall
14$e$. External wall
R14$e$. Radius
A14$i$, A14$e$. Axis
140. Second drive means
141. Toothed ring
142. Motor
A142. Rotation axis
143. Pinion
15. Reference body
A15. Axis
15$i$. Internal wall
X. Horizontal reference axis
Y. Vertical reference axis
16. Means for driving in translation
161. Threaded rod
162. Motor
A162. Rotation axis
17. Connection means
18. Connection finger
E18, E18'. Longitudinal end
L18. Longitudinal portion
G18. Guide stud
D18. Direction
P. Drilling
T. Path
TC. Circular section
TNC. Non-circular section
ω13. Rotation speed of first eccentric
ω14. Rotation speed of second eccentric

The invention claimed is:

1. An orbital drilling device comprising, on a frame:
a spindle motor;
a cutting tool rotated by said spindle motor, about a rotation axis;
a first, inner, eccentric comprising a hollow cylindrical body integrally receiving said spindle motor, said first eccentric being configured to be mounted to be able to rotate with respect to the spindle motor, said spindle motor being configured to be mounted and in rotation with respect to the frame about the rotation axis of the cutting tool, the first eccentric comprising an internal cylindrical wall having a first inner axis and an external cylindrical wall having a first outer axis, the first inner axis of the internal cylindrical wall being offset by a distance with respect to the first outer axis of the external cylindrical wall;
a second, outer, eccentric comprising a hollow cylindrical body receiving the first eccentric, the first eccentric being mounted to be able to rotate with respect to the second eccentric, the second eccentric comprising an internal cylindrical wall having a second inner axis and an external cylindrical wall having a second outer axis, the second inner axis of the internal cylindrical wall being offset with respect to the second outer axis of the external cylindrical wall;
a reference body secured to the frame, the reference body comprising an internal cylindrical wall of a body axis, the reference body receiving the second eccentric, the second eccentric being mounted to be able to rotate with respect to the reference body;
a first drive configured to rotate the first eccentric with respect to the frame, at a first rotation speed, the first drive comprising
a first peripheral toothed ring mounted to rotate about the body axis of the reference body, the first peripheral toothed ring being constrained to rotate with the first eccentric, the first peripheral toothed ring and the first eccentric being secured together by an Oldham coupling in order to compensate for any offset between the first peripheral toothed ring and the first eccentric, and
a first motor secured to the frame, the first motor comprising a drive shaft, a first toothed pinion being mounted on the drive shaft of the first motor meshing with said first peripheral toothed ring;
a second drive configured to rotate the second eccentric with respect to the frame, at a second rotation speed, simultaneously with the rotation of the first eccentric with respect to the frame, the second drive comprising
a second peripheral toothed ring secured to and coaxial with the second outer axis of the external cylindrical wall of the second eccentric, and
a second motor, a second toothed pinion being mounted on the drive shaft of the second motor and meshing with said second peripheral toothed ring; and
a controller configured to produce a drilling to a required shape and dimensions through the following of a given path by the cutting tool,
wherein said controller is configured to reproduce any path of the cutting tool in a zone by continuous control during the drilling of an angular offset between an angular position Θ13 of the first eccentric with respect to the frame and an angular position Θ14 of the second eccentric with respect to the frame, wherein the first motor of the first drive and the second motor of the second drive are disposed to be offset longitudinally, along the body axis of the reference body with respect to the spindle motor rotating the cutting tool, the spindle motor driving the cutting tool received in the first eccentric, the spindle motor being positioned in an intermediate longitudinal position between the cutting tool and the first and second motors of the first drive and the second drive, and wherein the first motor of the first drive and the second motor of the second drive are each overlapping radially with respect to a radius of the external cylindrical wall of the second eccentric.

2. The device according to claim 1, wherein the first motor of the first drive and the second motor of the second drive are fixed to a same fixing wall, the fixing wall being secured to the frame.

3. The device according to claim 2, further comprising a cutting tool drive configured to drive the cutting tool in translation, in a direction parallel to the rotation axis of the cutting tool.

4. The device according to claim 3, wherein the translation drive comprises a screw and nut system comprising a threaded rod rotated by a translation motor and a nut mounted to move in translation with respect to the frame, said threaded rod being received in said nut.

5. The device according to claim 4, wherein the translation motor of the translation drive is fixed to said fixing wall of the frame.

6. The device according to claim 4, wherein the translation motor of the translation drive has one or more of the following characteristics:
low-voltage motor that is below 48 volts,
brushless electric motor,
external-rotor motor,
weight-to-power ratio greater than 5 W/g,
using a magnet technology with a high Curie point that equals to approximately 200° C., and
having winding wires the insulators of which withstand temperatures of 180° C.

7. The device of claim 6, wherein the low-voltage motor has a rating of less than 48 volts, wherein the Curie point of the magnet is equal to approximately 200° C.

8. The device according to claim 4, wherein the threaded rod of the screw and nut system is mounted in direct drive on a rotor of the translation motor, the threaded rod being rigidly secured to the rotor.

9. The device according to claim 2, wherein one or more of the first motor of the first drive and the second motor of the second drive has one or more of the following characteristics:
low-voltage motor that is below 48 volts,
brushless electric motor,
external-rotor motor,
weight-to-power ratio greater than 5 W/g,
using a magnet technology with a high Curie point that equals to approximately 200° C., and
having winding wires the insulators of which withstand temperatures of 180° C.

10. The device according to claim 1, wherein one or more of the first motor of the first drive and the second motor of the second drive has one or more of the following characteristics:
low-voltage motor that is below 48 volts,
brushless electric motor,
external-rotor motor,
weight-to-power ratio greater than 5 W/g,
using a magnet technology with a high Curie point that equals to approximately 200° C., and
having winding wires the insulators of which withstand temperatures of 180° C.

11. The device of claim 10, wherein the low-voltage motor has a rating of less than 48 volts, and
wherein the Curie point of the magnet is equal to approximately 200° C.

12. The device according to claim 1, wherein the first toothed ring of the first drive and the second toothed ring of the second drive are identical, having a same diameter, a same number of teeth, and a same tooth pitch and profile.

13. The device according to claim 1, wherein the spindle motor rotating the cutting tool comprises a stator and a rotor, the cutting tool being mounted for direct driving on said rotor of said spindle motor being rigidly secured to the rotor.

14. The device according to claim 1, wherein the spindle motor rotating the cutting tool comprises a connector configured to connect to an energy source in order to supply said spindle motor with energy, said connector being disposed at a rear longitudinal end of the spindle motor, opposite to the cutting tool, and
further comprising a connection finger configured to receive in connection said connector of the motor, in order to provide a connection of said energy source to said spindle motor, said connection finger being connected to the frame by a guide means configured to allow a rotation of the connection finger with respect to the frame about a rotation finger axis, with a limited angular movement, combined with a translation of said rotation finger axis in a direction substantially perpendicular to the rotation finger axis, over a limited distance, to substantially immobilize the spindle motor with respect to rotation about the rotation axis of the cutting tool, with a limited angular movement, by the connector.

* * * * *